United States Patent
Wickham et al.

(10) Patent No.: US 7,610,415 B2
(45) Date of Patent: Oct. 27, 2009

(54) SYSTEM AND METHOD FOR PROCESSING DATA STREAMS

(75) Inventors: Mark H Wickham, Eagan, MN (US); Travis Lubbers, St. Louis Park, MN (US); Brad Jacula, Minneapolis, MN (US)

(73) Assignee: Digi International, Minnetonka, MN (US)

( * ) Notice: Subject to any disclaimer, the term of this patent is extended or adjusted under 35 U.S.C. 154(b) by 395 days.

(21) Appl. No.: 11/191,598

(22) Filed: Jul. 28, 2005

(65) Prior Publication Data

US 2007/0028015 A1 Feb. 1, 2007

(51) Int. Cl.
*G06F 3/00* (2006.01)
*G06F 13/00* (2006.01)

(52) U.S. Cl. .............. 710/52; 710/33; 710/36; 710/54; 710/56; 710/15

(58) Field of Classification Search .......... 710/22–28, 710/33–34, 52–57; 714/1–5, 18
See application file for complete search history.

(56) References Cited

U.S. PATENT DOCUMENTS

| | | | | |
|---|---|---|---|---|
| 5,561,816 A | * | 10/1996 | Mitsuhira et al. | 710/22 |
| 5,649,122 A | * | 7/1997 | Wegner et al. | 710/105 |
| 5,933,654 A | * | 8/1999 | Galdun et al. | 710/23 |
| 5,949,787 A | | 9/1999 | Wegner et al. | |
| 7,249,202 B2 | * | 7/2007 | Simon et al. | 710/22 |
| 2005/0027901 A1 | * | 2/2005 | Simon et al. | 710/22 |
| 2005/0120360 A1 | * | 6/2005 | Makhervaks et al. | 719/321 |
| 2005/0289253 A1 | * | 12/2005 | Edirisooriya et al. | 710/22 |
| 2006/0031524 A1 | * | 2/2006 | Freimuth et al. | 709/227 |
| 2006/0095611 A1 | * | 5/2006 | Winchester et al. | 710/52 |

OTHER PUBLICATIONS

"XR17C158—5V PCI Bus Octal Uart (Octal Universal Asynchronous Receiver and Transmitter)", (Rev. 1.4.2) (Exar),(Jan. 2005).*
"File Chaining and FAT Cluster Allocation", Aug. 26, 2000, The PC Guide, http://www.pcguide.com/ref/hdd/file/clustChaining-c.html.*
"XR17C158—5V PCI Bus Octal Uart (Octal Universal Asynchronous Receiver and Transmitter)", (Rev. 1.4.2) (Exar),(Jan. 2005), 66 pgs.

* cited by examiner

*Primary Examiner*—Alan Chen
(74) *Attorney, Agent, or Firm*—Schwegman, Lundberg & Woessner, P.A.

(57) ABSTRACT

A system and method of transferring characters from a first device through a buffer memory to a second device. A descriptor is read and a buffer address and a buffer length are extracted from the descriptor, wherein the buffer address and buffer length define a buffer of data stored in the first device. The data stored in the buffer is transferred from the buffer to the buffer memory, and from there to the second device. A check is made to determine if the descriptor should be closed and, if the descriptor should be closed, an indication is made that the descriptor is closed.

38 Claims, 8 Drawing Sheets

SYSTEM AND METHOD FOR PROCESSING DATA STREAMS

TECHNICAL FIELD

This patent document pertains generally to data communications, and more particularly, but not by way of limitation, to a system and method for processing a stream of data.

BACKGROUND

A Universal Asynchronous Receiver/Transmitter (or UART) is an integrated solution used on almost every asynchronous serial system. The UART is responsible for implementing the asynchronous communication process as both a transmitter and a receiver (both encoding and decoding data frames). The UART not only controls the transfer of data, but the speed at which communication takes place.

The first UARTs could only handle one byte of information at a time, which meant that the computer's processor needed to immediately process any transmission or risk losing data as the next byte of information pushed its way onto the UART. Not only did this make for unreliable and slow communication, it placed unreasonable demands on the processor, slowing down the entire system.

Improved UARTs, such as the 16750 UARTs, increase communication speed and lower system overhead by offering 64-byte or 128-byte FIFOs (first in first out buffers). With the increased FIFO buffer size, the UART can store enough information that the data stream need not be suspended while the processor is busy. This is particularly helpful in multitasking operating systems such as Windows 2000/XP. Still, the processor has to periodically poll the UART to see if there is any data to be read, or receive and respond to an interrupt from the UART, with the overhead associated with interrupt processing.

In addition, computer systems spend a lot of the available CPU horsepower in scanning incoming data for special values that need special processing, and in transferring the characters to their destination within the computer.

What is needed is a system and method for speeding the transfer of data into and out of a computer system. In addition, what is needed is a system and method for reducing the demand on the processor in transferring data to and from a UART.

DETAILED DESCRIPTION

Figure 1:
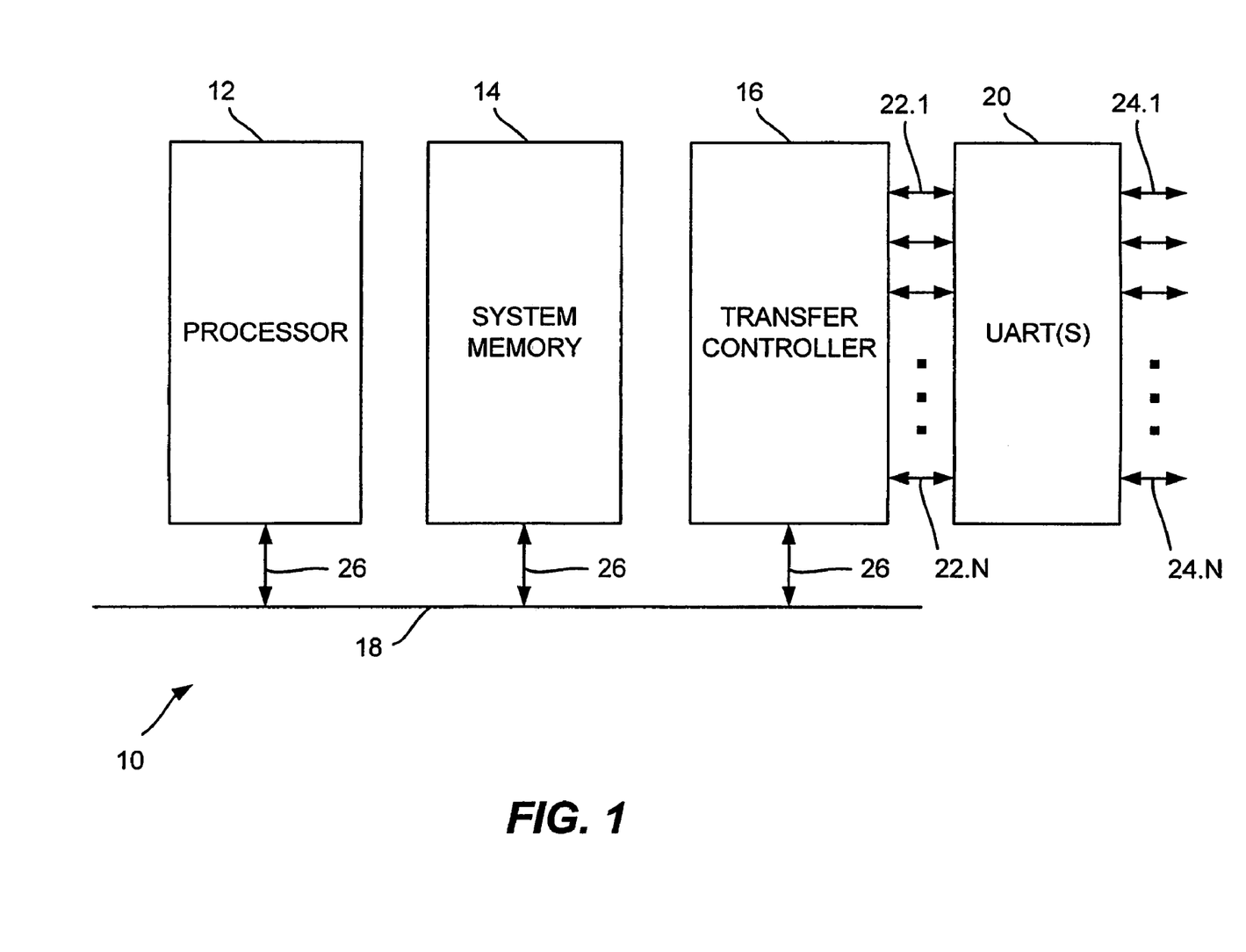
FIG. 1 is a schematic illustration of a computer system having a transfer controller.

A schematic illustration of an example computer system 10 is shown in FIG. 1. Computer system 10 includes a processor 12 connected over a system bus 18 to system memory 14 and transfer controller 16. Processor 12, system memory 14 and transfer controller 16 are connected by bus interface 26 to system bus 18.

Transfer controller 16 is connected in turn to one or more UARTs 20 over UART channels 22.1 through 22.N, where N is the number of UART channels. UARTs 20 communicate to other data equipment over interfaces 24.1 through 24.N.

In the embodiment shown, transfer controller 16 attaches to system bus 18 (e.g., localbus or PCI bus). In one embodiment, transfer controller 16 and one or more UARTs 20 are mounted on a single printed circuit board that plugs into a PCI connector.

In one embodiment, system bus 18 is designed to allow transfer controller 16 to master the bus to read and write system memory 14 directly. Descriptors are laid out in memory for each channel 22 and device registers are programmed to point at the first descriptor for each channel 22. Then each channel 22 is started.

In one embodiment, system memory 14 includes Dynamic Random Access Memory (DRAM). Other embodiments of system memory 14 include, e.g., First-In-First-Out (FIFO) memory and/or Static Random Access Memory (SRAM).

Figure 2:
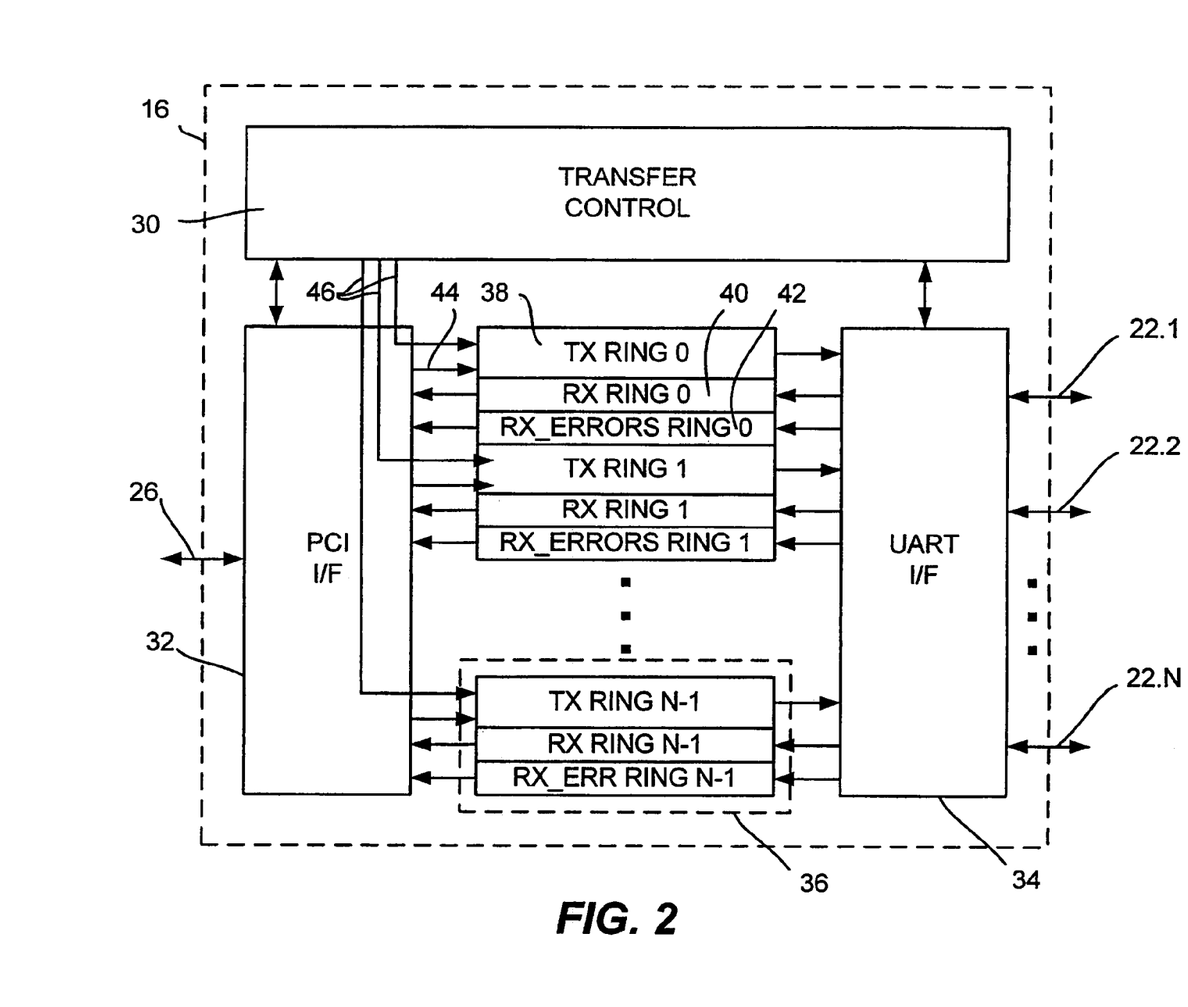
FIG. 2 illustrates a transfer controller.

One embodiment of transfer controller 16 is shown in FIG. 2. In the example embodiment shown in FIG. 2, transfer controller 16 includes a transfer control unit 30, a bus interface unit 32, a UART interface unit 34 and N sets of ring buffers 36. Each ring buffer set 36 includes a transmit ring buffer (TX Ring) 38, a receive ring buffer (RX Ring) 40 and a RX_ERRORS ring buffer 42. Ring buffer 38 is a buffer memory used to store data prior transfer to the communication device (e.g., UART 20). Ring buffers 40 and 42 are buffer memories that are used to store data prior to transfer to system memory 14. In one embodiment, ring buffers 38, 40 and 42 are implemented as FIFOs.

Bus interface unit 32 includes a bus interface 26 used to connect to system bus 18. In the embodiment show, system bus 18 is a PCI bus. Transfer control unit 30 and bus interface unit 32 each access (via 44, 46) the ring buffers 38, 40, 42.

In one embodiment, each RX ring buffer 40 receives data items one at a time from its associated UART through UART interface unit 34. In one such embodiment the data items are eight bits wide (a byte). At the same time, a status word representing error status, if any, is stored in RX_ERRORS ring buffer 42 for subsequent transfer to system memory 14. In one embodiment, each item of data is one byte long. In another embodiment, each item of data is a data packet in length.

In one embodiment, descriptors are used to define the data. In one such embodiment, status associated with the buffer is stored as the first word of the descriptor. In one such embodiment, as characters are received into RX ring buffer 40, they are checked against a match list and special characters are detected. Other special cases can be detected as well, such as parity errors or other errors. If any of these special cases are found, the descriptor is closed, with an indication of which special case was found in the status of the descriptor. The device then advances to the next descriptor.

Figure 3:
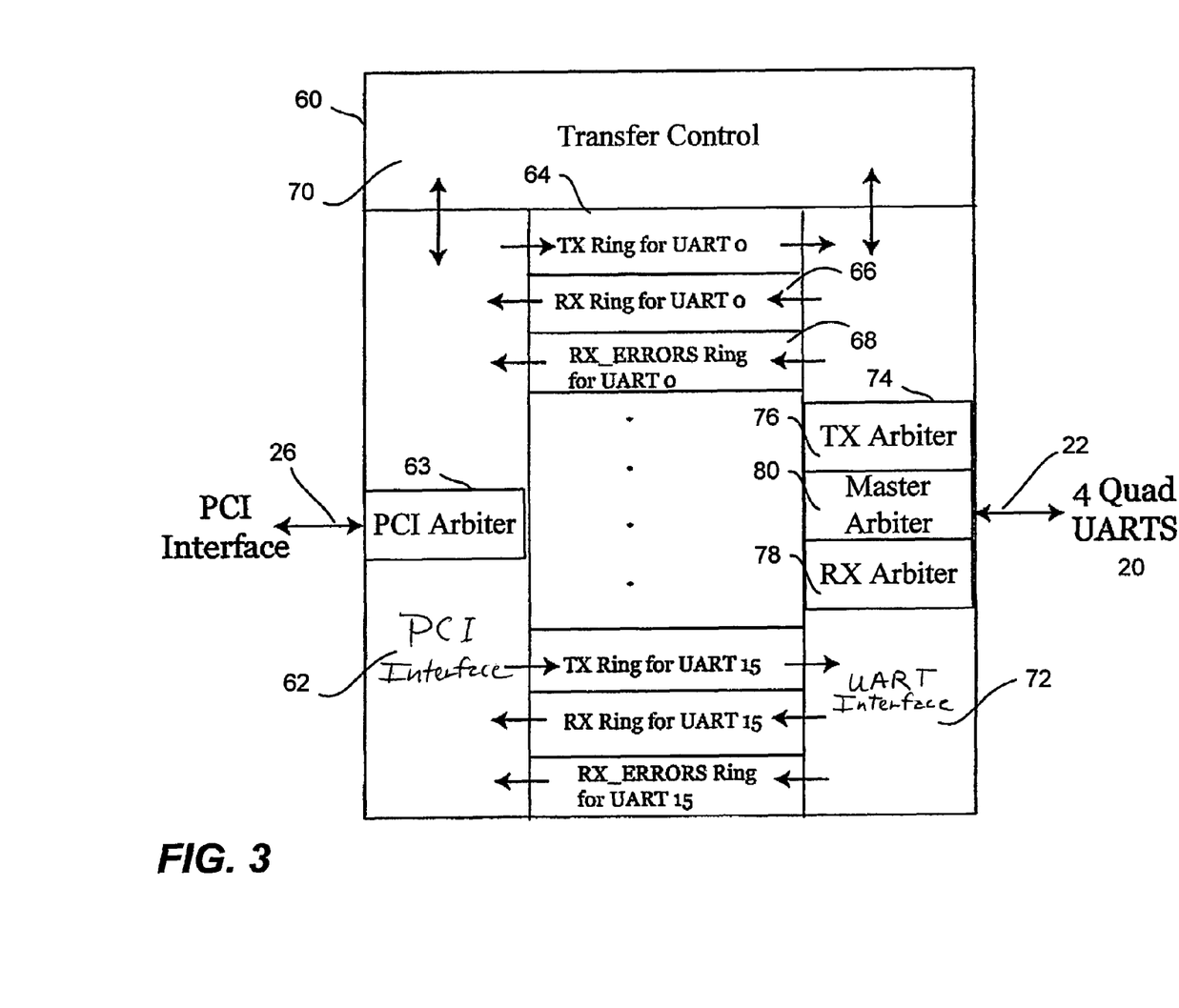
FIG. 3 illustrates another example embodiment of a transfer controller.

In one embodiment, transfer controller 16 is implemented as a Field Programmable Gate Array (FPGA) such as FPGA 60 in FIG. 3. In the example embodiment shown in FIG. 3, FPGA 60 provides a PCI Interface for up to 4 Quad serial UARTs 20. Transfer controller 16 can be implemented in other integrated forms as well (e.g., other programmable logic devices, application specific integrated circuits (ASIC) or standard cells).

In one embodiment, up to three FPGAs 60 can be connected to PCI bus 18 at one time.

In the example embodiment shown in FIG. 3, FPGA 60 includes a PCI interface 62, a transfer control module 70, a UART interface module 72 and sixteen ring buffers 64, 66 and 68. In one such embodiment, PCI interface 62 acts as a PCI 2.2 device. It handles cycles both as an initiator (bus master) and a target (bus slave). It provides the PCI pins to connect to the PCI host (processor 12), and a Bus Master interface that allows FPGA 60 to initiate cycles on PCI bus 18. It supports bursts both as an initiator and a target. In one such embodiment, PCI interface 62 implements a compliant configuration space that provides a single memory base address for the entire FPGA.

In one embodiment, PCI interface 62 contains a PCI arbiter 63 that allows all of the serial FPGAs 60 to share a single processor request and grant pair (e.g., the Netsilicon NS9750 processor REQ/GNT pair). In one embodiment, FPGA 60 provides one upstream path (to processor 12), and two downstream serial REQ/GNT pairs driven by the arbiter.

In the embodiment shown in FIG. 3, TX ring 64, RX ring 66 and RX_ERRORS ring 68 are ring buffers (FIFOs) that contain the data flowing through the serial channels 24. TX ring 64 holds data transferred from PCI bus 18 and while the data is waiting to be written to the serial UART TX FIFOs.

Figure 4:
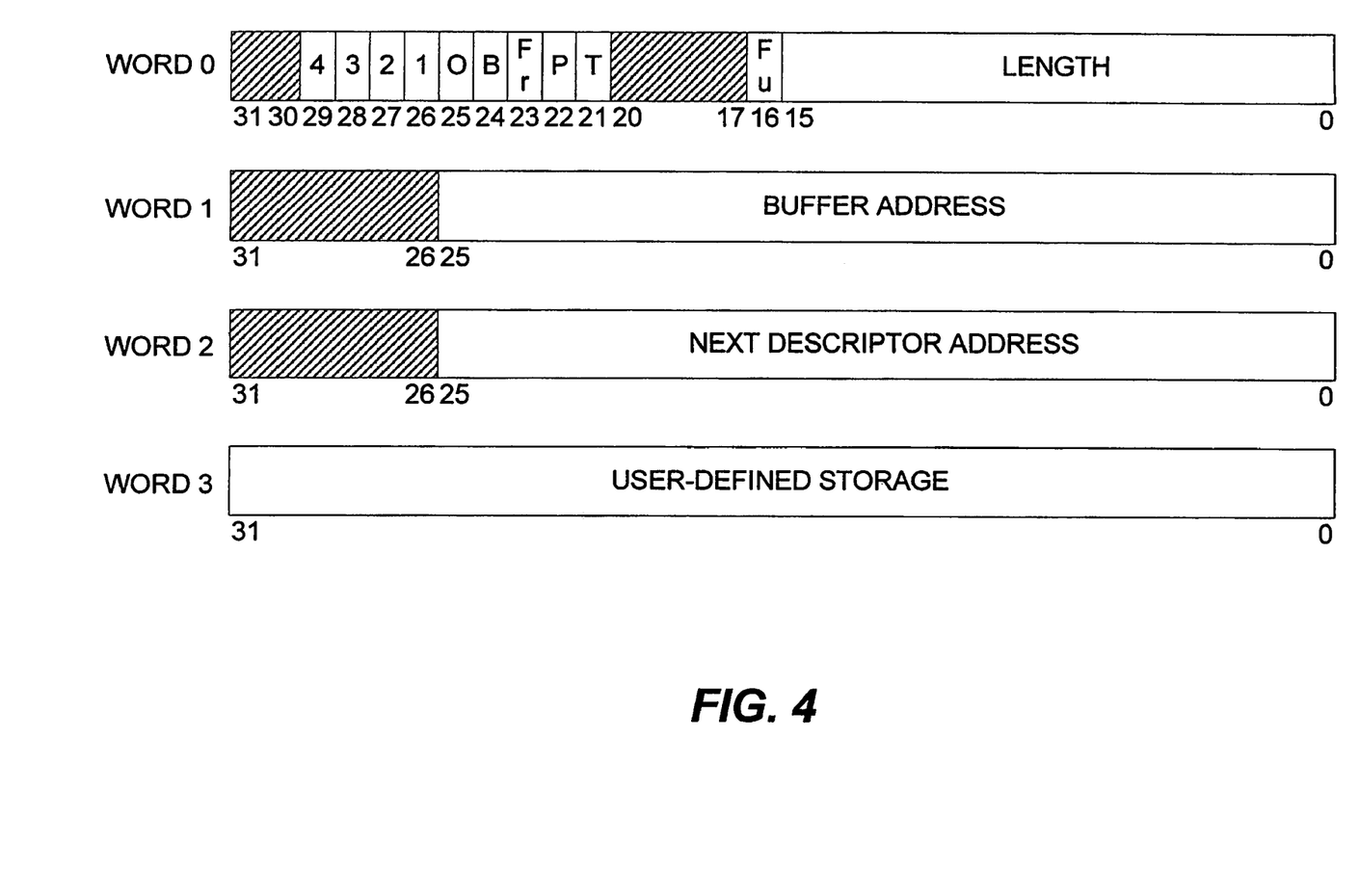
FIG. 4 illustrates a descriptor.

RX ring 66 holds data pulled from the UART RX FIFOs. When enough is available for a burst, it is sent across PCI bus 18. The RX_ERRORS ring 68 holds status information for the characters in RX ring 66. In one embodiment, transfer control 70 closes the current descriptor when an error or other special condition (e.g., character match) is read from RX_ERRORS ring buffer 68. Transfer control 70 writes the status into Word 0 of the descriptor as shown in FIG. 4. The status information and its associated data are then stored as the last entries in the descriptor buffer.

In the embodiment shown in FIG. 3, transfer control block 70 controls all transfers within FPGA 60. In the embodiment shown, transfer control block 70 handles the channels for the transmit (TX) and receive (RX) directions of up to 16 UARTs 20. Buffer descriptors are read from memory 14 using the Bus Master interface of the PCI module. In the transmit direction, the data from the TX descriptor is loaded via PCI bus 18 and written into TX ring 64 for that UART channel. When a descriptor empties, its status is written back to memory 14 and the next descriptor is read.

In the receive direction, the RX descriptors are read, data is pulled from RX rings 66 and RX_ERRORS rings 68, and the RX data is bursted through PCI bus 18 to the RX buffers in memory 14. RX_ERRORS status for each character is used to determine when to close the RX descriptor, and provides the status for that descriptor when closed. In one embodiment, transfer control 70 provides a register interface that allows software in processor 12 to read and write configuration and status registers.

In another embodiment, the separate RX_ERRORS ring buffer is eliminated; instead, the status bits associated with each item of receive data are stored with the data in the RX ring buffer.

In one embodiment, FPGA 60 uses PCI configuration space and base address 0 for all communication registers. PCI configuration items are placed in PCI configuration space. All UART, transfer control and RX/TX ring configuration information is placed in base address 0. Each UART is assigned an RX channel and a TX channel. These are indexed by UART number. There is a ring for each channel 24 that holds the data items to be transmitted or received. In one such embodiment, processor 12 writes a register (LAST_UART) in transfer control 70 telling FPGA 60 the number of UARTS attached to FPGA 60.

In one embodiment, channel descriptors are used to describe buffers of data. In one example embodiment, the TX and RX channel descriptors are similar, are placed on 16 byte boundaries, and are laid out in memory as shown in FIG. 4.

As shown in the example embodiment shown in FIG. 4, word 0 sets out the length of the descriptor and any status associated with the descriptor. In the example shown, bits 29:26 indicate a match on registers 4-1, bit 25 indicates an overflow, bit 24 indicates an RX break, bit 23 indicates an RX framing error, bit 22 indicates an RX parity error, bit 21 indicates timeout and bit 16 is a full bit. That is, bit 16 is set to "1" when the descriptor has been filled in. Bits 31:30 and 20:17 are reserved.

In the example shown in FIG. 4, bits 15:0 provide the length of the descriptor. For receives, processor 12 writes the number of data items allocated to the data buffer (e.g., the number of bytes). In one PCI-based embodiment, this number must be a multiple of 4. On completion, transfer control 70 rewrites the length field with the number of data items received and placed in this descriptor. Transfer control 70 then sets the full bit to indicate that the descriptor is completed.

For transmits, processor 12 fills in the number of data items to be transmitted. This number can be any number of data items. Transfer control 70 rewrites this length with the number of data items not transmitted, which, in one example embodiment, will always be 0.

Word 1 contains the buffer address, a pointer to the data buffer being used. In the embodiment shown there is a 64 MByte limit on addresses and, for receives, the pointer must be a multiple of 4 bytes. For transmits, the pointer can be on any byte.

Word 2 contains the next descriptor address, a pointer to next descriptor. In the embodiment shown there is a 64 MByte limit on addresses and both the receive pointer and transmit pointer must be a multiple of 16 bytes.

In the embodiment shown, Word 3 is optional user-defined storage.

In the example embodiment shown in FIG. 3, UART module 72 is the interface to up to 4 Quad UART devices 20. UARTs 20 provide RXRDY, TXRDY and other signals to module 72 to tell it when to transfer data. In one such embodiment, transmit and receive channels can be individually enabled or disabled by a write to the appropriate register in transfer control 70.

In one embodiment, the register interface of the UARTs allows module 72 to interrogate the status of each UART 20 and to transmit and receive character data and character status information to and from the UARTs 20. Data from the UARTs 20 is delivered to the associated RX ring 66 along with per character status to the RX_ERRORS ring 68.

Data for the UARTs is pulled from TX ring 64 and sent to the associated UART 20 when it is ready to accept it. UART module 72 provides a register interface that allows software in processor 12 to read and write configuration and status registers.

As noted above, the modern UART has a FIFO depth of up to 128 bytes. Because of this, once a block of data has been written to the FIFO of a UART 20, it can be difficult for a processor 12 to determine the bytes in the block that have been transmitted and the bytes in the block that remain to be transmitted.

To address this problem, in one embodiment data is sent to the UART on an as needed basis. That is, data is not allowed to build up in the UART TX FIFO. There are two advantages to this approach. First, it also allows the software in processor 12 to force a character out the serial port as quickly as possible; XON/XOFF characters are the most common use of this facility. Second, it makes it possible to determine the last word transmitted out of each UART. This can be advantageous when transfer controller 16 has to retransmit part of a data stream.

As shown in FIG. 3, UART interface module 72 is the glue logic in FPGA 60 between the FPGA and the UARTs 20. In the embodiment shown, UART interface module 72 services receive and transmit channels of up to 16 UARTS (e.g., four XR16C854 devices available from Exar Corporation (other 16550-compatible UARTs could be used as well)), as well as performs register reads/writes to from the UART channels 24. UART interface module 72 is also responsible for the passing of data to/from the UART FIFOS to internal memory in the FPGA. In one embodiment, each UART channel 24 arbitrates for use of either the receiver, or the transmitter or slave (register access) module when the channel needs to be serviced.

Arbiter module 74 of UART interface module 72 will be discussed next.

Arbiter module 74 includes a transmit arbiter 76, a receive arbiter 78 and a master arbiter 80. Transmit arbiter 76 is responsible for picking one of the TXRDY signals that come in from the UART for servicing. Up to 16 requests for service can come into this module. In one example embodiment, transmit arbiter 76 outputs a single encoded 4 bit value to master arbiter 80 to determine to whom the master arbiter will grant service.

In one embodiment, transmit arbiter 76 chooses from 16 channels in a round robin fashion, meaning they all have equal priority. For example, if TXRDY[5] is active and the arbiter chooses that one, and then TXRDY[0] goes active, it will potentially have to wait until channels 6-15 are serviced before channel 0 can be serviced. Other priority schemes could be chosen as well depending on the application.

In one such embodiment, receive arbiter 78 also selects from channels using a round robin priority scheme. It chooses from up to 16 associated RXRDY signals to indicate that a particular UART receiver is ready to be serviced. In another embodiment, receive arbiter 78 applies a least recently used (LRU) priority scheme in selecting channels to service.

In one embodiment, master arbiter 80 has three inputs. One input is from the Transmit Arbiter, one is from the Receive Arbiter, and one is a slave req (for register accesses to UARTS 20). The master arbiter performs arbitration between all three of these using a state machine. Slave accesses are given top priority, followed by the receiver and transmitter. After a receiver or transmitter is finished being serviced, master arbiter 80 checks to see if a req for a slave access has come in so it can service it. In one embodiment, master arbiter 80 receives a 4 bit encoded value from the Receive channel, a 4 bit encoded value from the Transmit channel and a REQ from the PCI side for use in determining priority.

In one embodiment, master arbiter 80 outputs one request to a reg_access module in UART interface module 72 (which allows slave accesses), 16 rxrdy requests and 16 txrdy requests. The RXRDY requests are all fed to receiver arbiter 78, and the TXRDY requests are all fed to transmit arbiter 76.

A receiver section in UART module 72 is responsible for the transfer of data from the UART FIFOS to the internal memory in FPGA 60. In one embodiment, data is transferred serially; in another data is transferred in parallel.

The requests for service come from master arbiter 80, which drives the whole state machine in the receiver. The receiver module checks the interrupt status register (ISR) upon a valid request for service to determine the mode of access it needs to perform. Currently there are three modes of access: no error, error and timeout. The no error scenario will be discussed first.

In the no error scenario, the receiver reads the ISR in UART 20, finds out that there are no errors in the Receive FIFO, then performs continuous reads from the RHR (receive holding register) which is where the data from the FIFO passes through on an external read. This will empty the receive FIFO of UART 20 of data. It also performs the transfer of data to the RX ring buffer in FPGA 60 assigned to the UART channel.

In the error scenario, the receiver reads the ISR, and knows that there is an error in one of the bytes in the UART RX FIFO. It performs a read of the LSR first to determine if the current byte in the RHR has an error and perform a transfer of the byte to the RX ring buffer. It also transfers the contents of the corresponding LSR error bits to the RX_ERROR ring buffer associated with the RX ring buffer. In one embodiment, the RX_ERROR ring buffer is eleven bits wide. Its contents are used to determine whether to close the descriptor.

In the timeout scenario, the receiver reads the ISR and finds out there was a timeout on the RX channel of UART 20. The receiver knows that reception stopped because of a timeout, empties the receive FIFO of UART 20 and sets a corresponding bit in RX_ERROR to indicate to transfer control 70 that there was a timeout.

In one embodiment, transfer control 70 accumulates characters until a predetermined number of characters have been received and then sends that number of bytes as a burst to system memory 14. In one such embodiment, a register holds a watermark value used to determine that enough characters have been received to initiate a burst of data to memory 14. This process continues until you reach the end of the buffer or you have received some sort of exception status. In one embodiment, a register holds a timeout value used to close a buffer if no characters are received within a particular time period. In the event of a timeout, transfer control 70 closes the RX descriptor and proceeds to the next descriptor.

Figure 5:
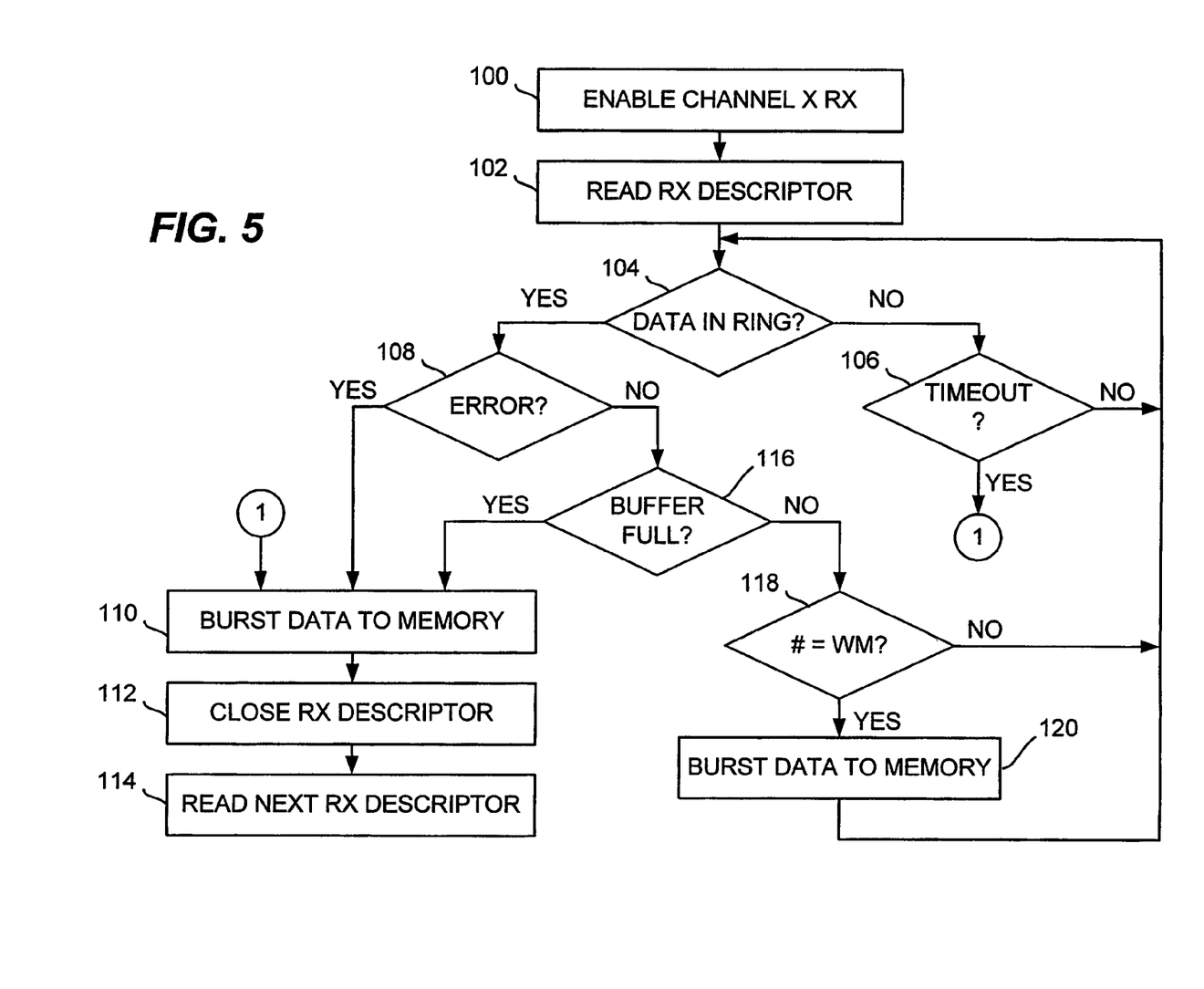
FIG. 5 illustrates a receive transaction.

An example of one such embodiment of an RX transfer is shown in FIG. 5. In FIG. 5, at 100, processor 12 writes to a register in FPGA 60 to enable receive transfers on a channel. Transfer control 70 of FPGA 60, at 102, reads a receive descriptor from system memory 14 and begins to respond to the UART associated with the channel.

In one embodiment, each UART 20 sets its interrupt line when a word is in its receive FIFO. UART interface 72 responds to the interrupt line of the UART by transferring data from the receive FIFO of the UART to RX ring buffer 66 until the FIFO is empty.

In another embodiment, UART interface 72 uses the buffer full line or other status indicator to initiate a transfer from the UART to the RX ring buffer.

In yet another embodiment, UART 20 pushes data as it is received into RX ring buffer 40 and RX_ERRORS ring buffer 42.

Transfer control 70 checks at 104 for data in RX ring buffer 66. If there is no data, control moves to 106, and a check is made to determine if the receive transfer has timed out.

In one embodiment, each receive channel includes an rx_counter. Timeout occurs on the channel when the rx_counter becomes >rx_timeout. Each channel operates independently; the rx_counter for a channel is reset every time a character is received on that channel.

In one embodiment, all rx_counters advance when the divisor wraps. In one such embodiment, the divisor is a 14 bit counter that advances once each clock; the rx_counter and rx_limit are each 8 bits wide. In a PCI-based system, the clock used to advance the divisor is the PCI clock. In one embodiment, an rx_timeout is provided for each RX channel. In another embodiment, only a single rx_timeout is provided for use by all the RX channels.

If the receive transfer has timed out, control moves to 110, and the data accumulated but not yet transferred is transferred to system memory 14 at 110. Control then moves to 112, where transfer control 70 closes the descriptor by setting the full bit and buffer length in Word 0 and recording status bits in Word 0 corresponding to the timeout condition. Control then moves to 114, where transfer control 70 reads the next RX descriptor (based on the pointer in Word 2).

If the process has not timed out at 106, control moves to 104 and a check is made for data in RX ring buffer 66.

When data is detected, control moves to 108, where a check is made on the status bits in RX_ERROR ring buffer 68 associated with the data in RX ring buffer 66. If there is an error associated with the data item being read from RX ring buffer 66, in one embodiment control moves to 110, and the data accumulated but not yet transferred is transferred to system memory 14 at 110. Control then moves to 112, where transfer control 70 closes the descriptor by setting the full bit and buffer length in Word 0 and recording status bits in Word 0 corresponding to the error detected. Control then moves to 114, where transfer control 70 reads the next RX descriptor (based on the pointer in Word 2).

The benefit of closing the buffer on receipt of an error is that now processor 12 only has to check the last word in the buffer to find the data item associated with the error. This is in contrast to current systems, which store both the data item and its status to memory, requiring that processor 12 scan through the entire buffer to determine if the existence and type of errors that may or may not be present.

In one embodiment, the contents of the RX_ERROR ring buffer status associated with the data item that generated the error are stored as the last word in the buffer. In that case, processor 12 only has to look at the last two pieces of data in the buffer to get a complete picture of the error and the data associated with the error.

If, at 108, no error is detected, control moves to 116, where a check is made to determine if the data item read from the RX ring buffer is the last word in the buffer. If so, control moves to 110, and the data accumulated but not yet transferred is transferred to system memory 14 at 110. Control then moves to 112, where transfer control 70 closes the descriptor by setting the full bit in Word 0 (the buffer length remains the same). Control then moves to 114, where transfer control 70 reads the next RX descriptor (based on the pointer in Word 2).

If, at 116, it is determined that the data item is not the last data item in the buffer, control moves to 118, where a check is made to see if enough data items have been accumulated to justify performing a block transfer to memory. If enough data items have been accumulated, control moves to 120 and the data accumulated but not yet transferred is transferred to system memory 14. Control then moves to 104.

If, however, enough data items have not yet accumulated at 118, control moves directly to 104.

There are a number of ways one could determine the best time to transfer data from RX ring buffer 66 to memory 14. Transfer control 70 could transfer each data item as it receives it. Such fine granularity in transferring data does not, however, use system bus 18 efficiently.

Transfer control 70 could wait until all the word in the buffer have been received before transferring any but that would require a large amount of storage in each RX ring buffer 66 and RX_ERROR ring buffer 68.

To avoid this, in one embodiment, transfer control 70 includes a RX_WATERMARK register. Processor 12 writes a value to the RX_WATERMARK register that indicates the number of data items necessary to cause a PCI burst write to the PCI descriptor buffer. In one such embodiment, the watermark must be a multiple of four. In such an embodiment, transfer control 70 uses the contents of the RX_WATERMARK register to determine at 118 whether to initiate a PCI burst write across system bus 18 to system memory 14.

In one embodiment, software executed by processor 12 provides receive buffers to transfer controller driver software. In one such embodiment, the software avoids the need to copy the buffer contents from one area of system memory to another by intelligent use of the buffer pointer in the receive descriptor. That is, the buffer can be filled by one program (the transfer controller driver) and emptied by another.

In one such embodiment, the transfer controller driver is given data buffers by some other software module. The driver software places those pointers into the RX descriptors. After they are filled in, the other software module is notified that the data is available, and it is already in that module's data buffer. No data copy needs to be performed.

In one embodiment, the receiver section compares the character received from the FIFO to certain match registers to determine whether or not to close out a buffer. In one such embodiment, this function can be enabled or disabled as needed through a write to the appropriate register as will be discussed below. Such an approach can be used to detect special characters used for flow control, or to perform symbol recognition.

In one embodiment, the receiver section masks bits of the received data. In another embodiment, the receiver section packs the data received before transferring the data into its associated RX ring buffer 66.

The transmit section takes data from TX ring buffer 64 and sends it to the UART 20 associated with its channel. In one embodiment, TX ring buffer receives four bytes of data at a time from PCI interface 62 and transmits the data one byte at a time to UART 20. In one such embodiment, TX ring buffer 64 is 36 bits wide; transfer control 70 sets a status bit associated with each byte. If the bit is set, the byte is valid and can be transferred to UART 20. This allows for transfer of less than all four bytes in a 32 bit word (e.g., when the buffer length is not a multiple of four).

Figure 6:
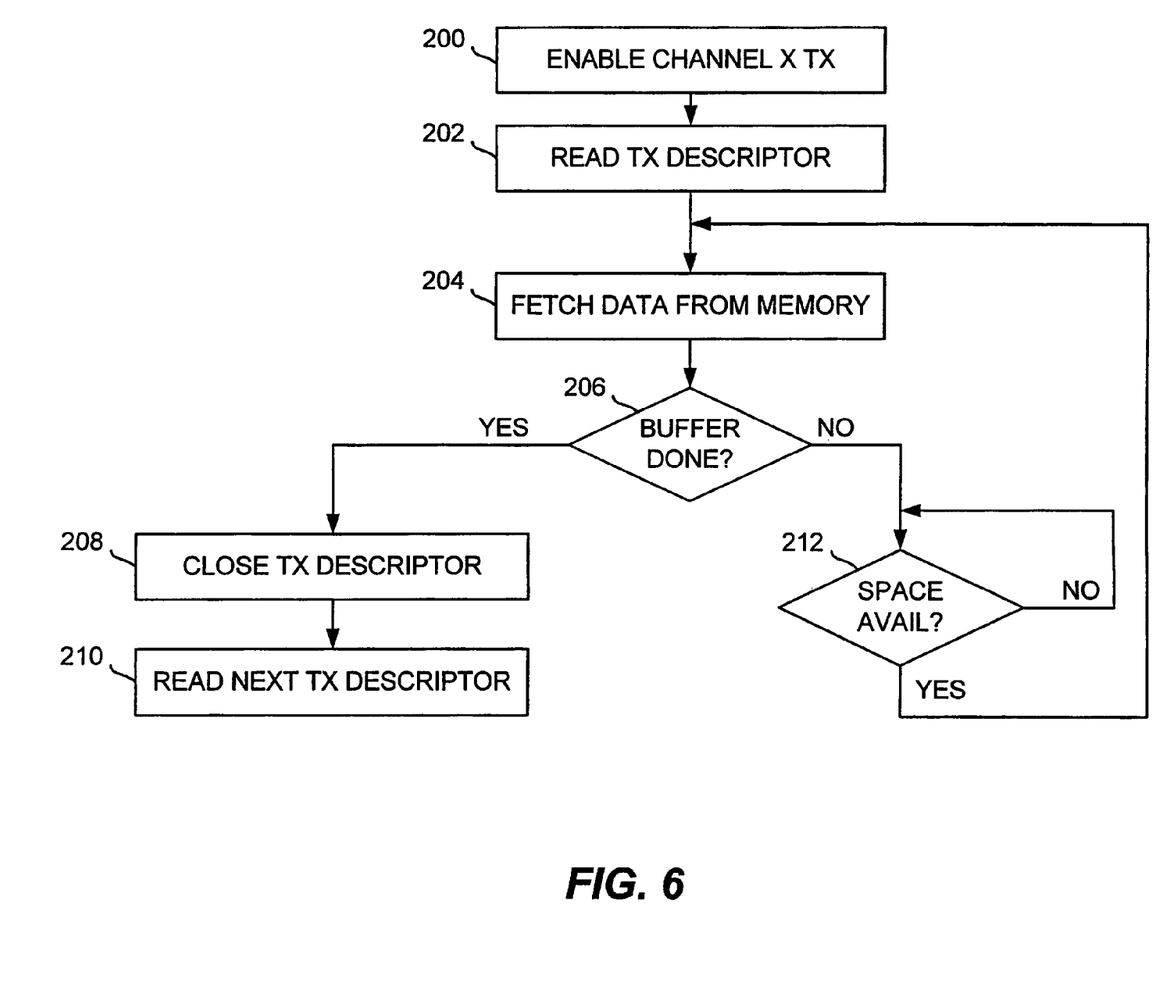
FIG. 6 illustrates a transmit transaction.

One example embodiment of a transmit process is shown in FIG. 6. In FIG. 6, at 200, processor 12 writes to a register in FPGA 60 to enable transmit transfers on a channel. At 202, transfer control 70 of FPGA 60 reads a transmit descriptor from system memory 14 and, at 204, begins to fetch data from system memory 14 to send to the UART 20 associated with the channel.

In one embodiment, transfer control 70 initiates a master cycle on system bus 18 to get the descriptor. If the full bit is set, transmit control 70 takes data from system memory 14 (using PCI buffer requests if system bus 18 is PCI bus) and save the data to the correct TX ring buffer 64.

If transmit control determines at 206 that the first data transfer transferred all of the data in the buffer, control moves to 208, and the transmit descriptor is closed by clearing the full bit and setting the buffer length to zero. Control then moves to 210, where the next descriptor is read from the location pointed to in Word 2.

If the check at 206 indicates that more data remains in the buffer, control moves to 212 and a check is made to determine if more characters should be transferred to TX ring buffer 64. In one embodiment, a new character is transferred across the system bus each time a space opens in TX ring buffer 64. In another embodiment, TX ring buffer is 36 bits wide (32 bits of data and 4 bits of status). In such an embodiment, transfers are made in four byte increments.

In another embodiment, transfer control 70 minimizes traffic on system bus 18 by transferring blocks of data from memory to TX ring buffer 64. In one embodiment, transfer control 70 executes a new block transfer from memory when it determines the block will fit into TX ring buffer 64. In one such embodiment, a register holds a watermark value used to determine that TX ring buffer 64 has enough room to store the next block of characters. In such an embodiment, a check is made at 212 to determine that TX ring buffer 64 has enough room to store the next block of characters. If not, transmit control 70 remains at 206.

If, however, transmit control 70 determines at 206 that TX ring buffer 64 has enough room to store the next block of characters, control moves to 204 and a new block of data is read from system memory 14. Control then moves to 206.

If transmit control determines at 206 that the last data transfer transferred all of the data in the buffer, control moves to 208, and the transmit descriptor is closed by clearing the full bit and setting the buffer length to zero. Control then moves to 210, where the next descriptor is read from the location pointed to in Word 2.

In one embodiment, software executed by processor 12 provides transmit buffers to transfer controller driver software. In one such embodiment, the software avoids the need to copy the buffer contents from one area of system memory to another by intelligent use of the buffer pointer in the transmit descriptor. That is, the buffer can be filled by one program and emptied by another. Once the transfer controller notifies the driver (via interrupt is one option) that the buffer has been transmitted, it can notify the module that the buffer can be reused.

In one embodiment, UART interface 72 includes a register access section. The register access section performs register accesses on the 16 UART channels. That is, processor 12 can access registers in each UART 20 through FPGA 60. In one such embodiment, register access is driven by a DMA interface to the PCI side of the FPGA and accesses to the UARTs are controlled through Arbiter section 74.

The internal register section contains the internal registers for UART interface 72. In one embodiment, the registers includes a match enable Register, one or more match registers, a force transmit register, a transmit disable register, and a transmit flush register.

The Match enable register tells the Receiver section to compare each incoming character to a set of match registers and determine if there is a match between them. If so, the buffers are closed. This is useful for such conditions as XON, XOFF, XXON, and XXOFF. In one embodiment, this register is an array of registers 6 bits wide (corresponding to the 6 match registers) that can be enabled.

The match registers are the registers that the incoming data from the receiver will be compared to, to determine if there is a match to them, depending on whether or not they have been enabled by the Match enable register.

The transmit register is used to load a byte to be transferred as soon as possible. Bytes written to this register are sent out as soon as possible on a UART channel.

The Transmit Disable Register gives the processor 12 the opportunity to stop the transfer of data from the memory 14 to the UART 20.

The Transmit Flush Register gives processor 12 the opportunity to flush all transmit buffers. The bit will be cleared on its own when completed.

Figure 7:
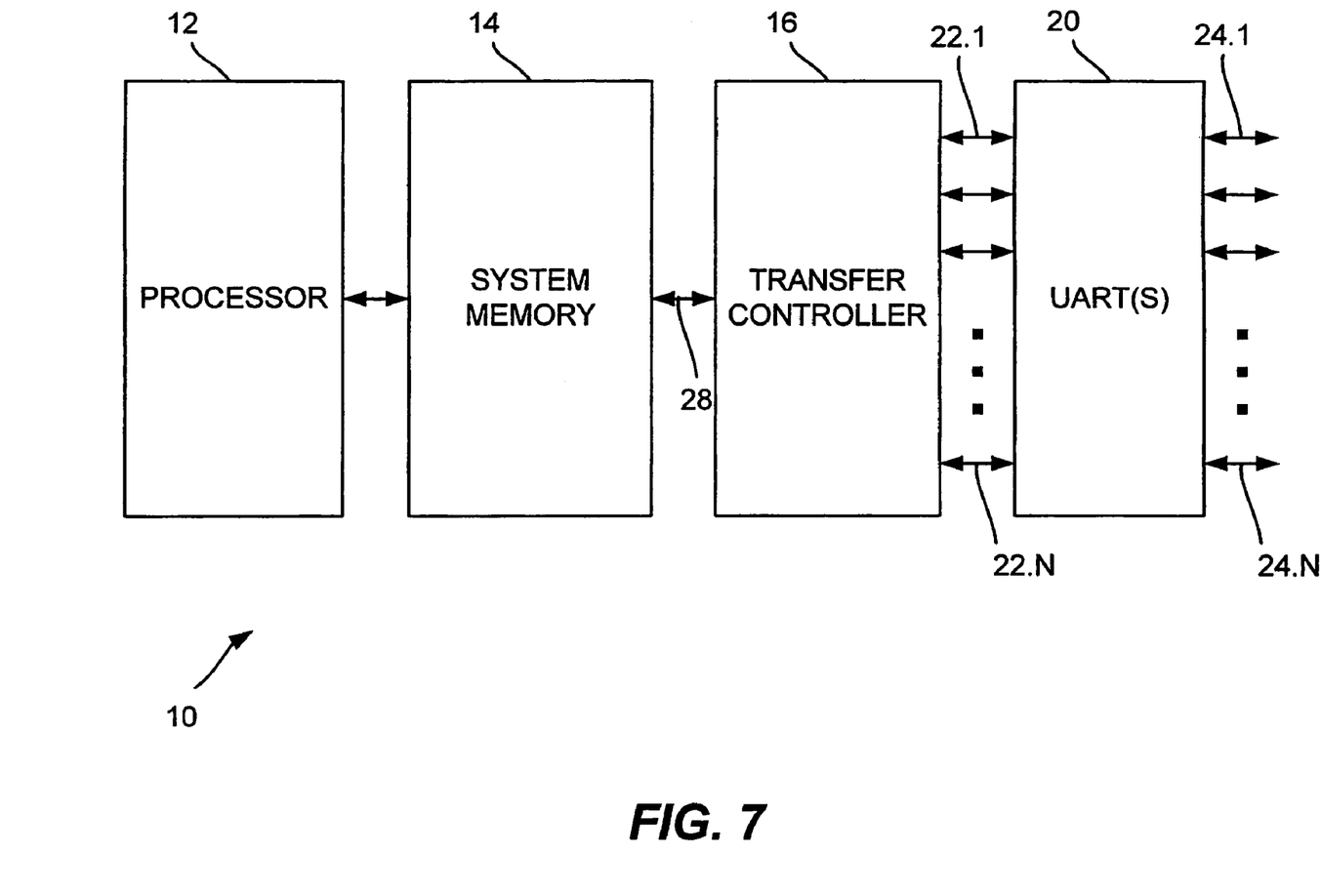
FIG. 7 is a schematic illustration of another computer system having a transfer controller.

A schematic illustration of another example computer system 10 is shown in FIG. 7. Computer system 10 includes a multi-port system memory 14 connected to a processor 12 and a transfer controller 16. Processor 12 and transfer controller 16 communicate through system memory 14.

Transfer controller 16 is connected in turn to one or more UARTs 20 over UART channels 22.1 through 22.N, where N is the number of UART channels. UARTs 20 communicate to other data equipment over interfaces 24.1 through 24.N.

In one embodiment, processor 12 uses descriptors as described above to enable the transfer of buffers of data to and from system memory 14. Descriptors are laid out in memory for each channel 22 and device registers are programmed to point at the first descriptor for each channel 22. Then each channel 22 is started.

In one embodiment, system memory 14 includes Dynamic Random Access Memory (DRAM). Other embodiments of system memory 14 include, e.g., First-In-First-Out (FIFO) memory and/or Static Random Access Memory (SRAM).

Figure 8:
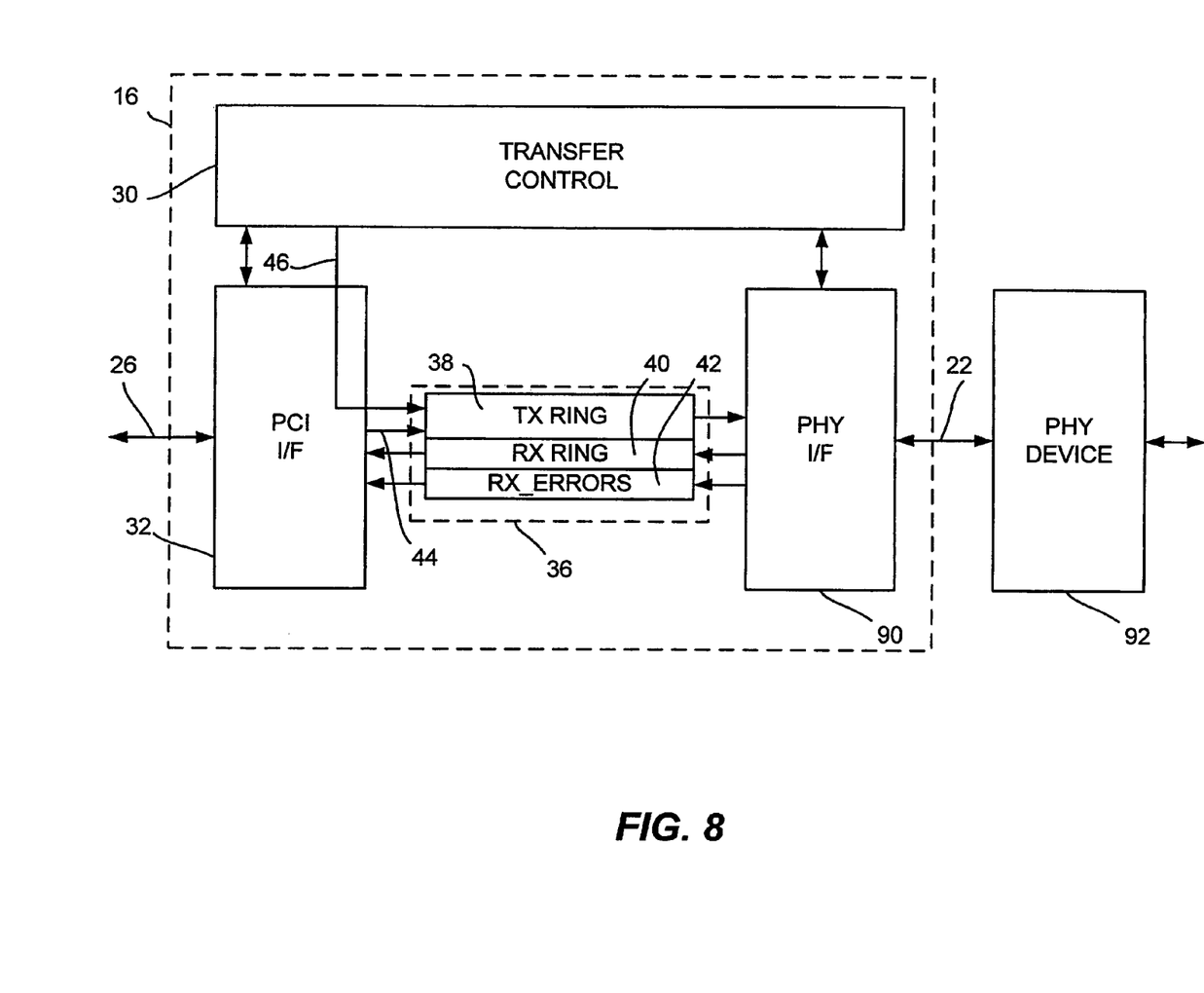
FIG. 8 illustrates another transfer controller.

Transfer controller 16 can be used with other communications devices as well. In one example embodiment, as shown in FIG. 8, transfer controller 16 includes a transfer control unit 30, a bus interface unit 32, a PHY device interface unit 90 and one or more sets of ring buffers 36. PHY device interface 90 is connected to a PHY level device 92 implementing a communications protocol such as Ethernet or any of the wireless protocols.

In the embodiment shown, each ring buffer set 36 includes a transmit ring buffer (TX Ring) 38, a receive ring buffer (RX Ring) 40 and a RX_ERRORS ring buffer 42. Ring buffer 38 is a buffer memory used to store data prior transfer to the communication device (e.g., UART 20). Ring buffers 40 and 42 are buffer memories that are used to store data prior to transfer to system memory 14. In one embodiment, ring buffers 38, 40 and 42 are implemented as FIFOs.

Bus interface unit 32 includes a bus interface 26 used to connect to system bus 18 as shown in FIG. 1. In the embodiment show, system bus 18 is a PCI bus. In another embodiment, bus interface unit 32 is replaced with a memory interface unit that can be connected through memory port 28 to system memory 14 as shown in FIG. 7.

In one embodiment, each RX ring buffer 40 receives data items one at a time from its associated PHY device 92 through PHY interface unit 90. In one such embodiment the data items are eight bits wide (a byte). At the same time, a status word representing error status, if any, is stored in RX_ERRORS ring buffer 42 for subsequent transfer to system memory 14.

In one embodiment, descriptors are used to define the data. In one such embodiment, status associated with the buffer is stored as the first word of the descriptor. In one such embodiment, as characters are received into RX ring buffer 40, they are checked against a match list and special characters are detected. Other special cases can be detected as well, such as parity errors or other errors. If any of these special cases are found, the descriptor is closed, with an indication of which special case was found in the status of the descriptor. The device then advances to the next descriptor.

Transfer controller 16 reduces CPU utilization to a great extent, so that its time can be spent on other activities. The cost of the CPU is reduced as well as high bit rates on multiple channels are possible, even with CPUs having reduced performance and price. Or more channels are possible with the same CPU speed. In one FPGA embodiment transfer controller 16 allows a single processor 12 to support 32 serial UARTs or more at one time in addition to the usual Ethernet connection, USB, etc.

Transfer controller 16 reduces the need for a high speed Central Processing Unit (CPU) by offloading much of the processing of the received data stream, even with multiple channels and high bit rates. For each descriptor buffer received, only the status of the descriptor and the last character in the buffer must be examined. All of the other characters in the buffer can be transferred directly without examination. This yields a system that performs well even with a large number of ports and has a lot of CPU power available for other tasks.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of receiving data from a device, comprising:
    reading a receive descriptor generated by a processor;
    extracting a buffer address and buffer length value from the receive descriptor, wherein the buffer address and buffer length value define a buffer in system memory;
    sensing receipt of data by the device;
    transferring the data from the device to a receive (RX) buffer memory;
    transferring status associated with the data to a status buffer memory, the status buffer memory being separate from the RX buffer memory;
    waiting for a predetermined number of data items to accumulate in the RX buffer memory;
    when the predetermined number of data items have accumulated in the RX buffer memory, reading data from the RX buffer memory, gaining control of a bus to the system memory and, while in control of the bus, writing the data read from the RX buffer memory to the buffer in the system memory;
    determining whether the buffer in system memory should be closed prematurely;
    if the buffer in system memory should be closed prematurely, modifying the receive descriptor to include a corrected buffer length and status derived from the status buffer memory, wherein the corrected buffer length is less than the buffer length value extracted from the receive descriptor; and
    providing the modified receive descriptor to the processor for further processing.

2. The method of claim 1, wherein the determining whether the buffer in system memory should be closed prematurely includes determining if the buffer in system memory is full.

3. The method of claim 1, wherein the determining whether the buffer in system memory should be closed prematurely includes determining if a receive timeout has occurred.

4. The method of claim 1, wherein the determining whether the buffer in system memory should be closed prematurely includes determining if an error is associated with the data read from the RX buffer memory.

5. The method of claim 1, wherein determining whether the buffer in system memory should be closed prematurely includes determining if a character read from the RX buffer memory is a special character.

6. The method of claim 1, wherein the device receives data serially and outputs it in parallel as a byte or more of data.

7. The method of claim 1, wherein the device is a Universal Asynchronous Receiver Transmitter (UART), a Universal Synchronous/Asynchronous Receiver Transmitter (USART), a Universal Serial Bus (USB) device or a PHY level device.

8. The method of claim 1, wherein the device receives data in packets and outputs it in parallel as a byte or more of data.

9. The method of claim 1, wherein transferring the data from the device to the RX buffer memory includes reading blocks of data from the device.

10. The method of claim 1, wherein transferring the data from the device to the RX buffer memory includes comparing the data to characters stored in a register.

11. The method of claim 1, wherein writing status includes setting a full bit.

12. The method of claim 1, wherein the method further comprises changing the predetermined number of data items.

13. A system for transferring data from a peripheral device to system memory, comprising:
    a bus interface capable of bus-mastering data to the system memory;
    a peripheral interface;
    a transmit (TX) buffer memory connected to the bus interface and the peripheral interface, wherein the TX buffer memory receives transmit data from the bus interface and transfers the transmit data through the peripheral interface;
    a receive (RX) buffer memory connected to the bus interface and the peripheral interface, wherein the RX buffer memory receives items of receive data from the peripheral device;
    a receive errors (RX_ERRORS) buffer memory connected to the bus interface and the peripheral interface, wherein the RX_ERRORS buffer memory is separate from the RX buffer memory and receives status from the peripheral interface associated with one or more of the items of the receive data; and
    a transfer control unit connected to the bus interface, wherein the transfer control unit is configured to:
        read a receive descriptor generated by a processor;
        extract a buffer address and buffer length value from the receive descriptor, wherein the buffer address and buffer length value define a buffer in the system memory;
        form a status word corresponding to the status received by the RX_ERRORS buffer memory;
        append the status word to a block of receive data to form a completed block;
        transfer the completed block through the bus interface to the buffer in system memory;
        determine whether the buffer in system memory should be closed prematurely;
        if the buffer in system memory should be closed prematurely, modify the receive descriptor to include a corrected buffer length, wherein the corrected buffer length is less than the buffer length value extracted from the receive descriptor; and
        providing the modified receive descriptor to the processor for further processing.

14. The system of claim 13, wherein the RX buffer memory is a ring buffer.

15. The system of claim 14, wherein the RX_ERRORS buffer memory is a ring buffer.

16. In a transfer controller having a receive buffer memory and a transfer control unit, a method of receiving data from a device, comprising:
    reading a receive descriptor generated by a processor;
    extracting a buffer address and buffer length value from the receive descriptor, wherein the buffer address and buffer length value define a buffer in system memory;
    sensing receipt of data by the device;

transferring the data from the device to a receive (RX) buffer memory, wherein transferring includes transferring one or more status bits with the data;
reading data from the RX buffer memory;
reviewing within the transfer control unit status associated with the data read from the RX buffer memory;
forming within the transfer control unit a status word corresponding to the status reviewed; and
writing the status word and the read data to the buffer in system memory, wherein writing includes:
taking control of a bus to the system memory through bus-mastering;
determining whether the buffer in system memory should be closed prematurely;
if the buffer in system memory should be closed prematurely, modifying the receive descriptor to include a corrected buffer length, wherein the corrected buffer length is less than the buffer length value extracted from the receive descriptor; and
providing the modified receive descriptor to the processor for further processing.

17. The method of claim 16, wherein the determining whether the buffer in system memory should be closed prematurely includes determining whether the buffer in system memory is full.

18. The method of claim 16, wherein the determining whether the buffer in system memory should be closed prematurely includes determining if a receive timeout has occurred.

19. The method of claim 16, wherein the determining whether the buffer in system memory should be closed prematurely includes determining if an error is associated with the data read from the RX buffer memory.

20. The method of claim 16, wherein the determining whether the buffer in system memory should be closed prematurely includes determining if a character read from the RX buffer memory is a special character.

21. The method of claim 16, wherein the device receives data serially and outputs it in parallel as a byte or more of data.

22. The method of claim 16, wherein the device is a Universal Asynchronous Receiver Transmitter (UART), a Universal Synchronous/Asynchronous Receiver Transmitter (USART), a Universal Serial Bus (USB) device or a PHY level device.

23. The method of claim 16, wherein the device receives data in packets and outputs it in parallel as a byte or more of data.

24. The method of claim 16, wherein the transferring the data from the device to the RX buffer memory includes reading blocks of data from the device.

25. The method of claim 16, wherein the transferring the data from the device to the RX buffer memory includes comparing the data to characters stored in a register.

26. A method of transferring data to a device, comprising:
reading a transmit descriptor generated by a processor;
extracting a transmit buffer address and a transmit buffer length value from the transmit descriptor, wherein the transmit buffer address and transmit buffer length value define a buffer in system memory;
determining if there is space for a predetermined number of data items in a transmit (TX) buffer memory;
if there is space for the predetermined number of data items in the TX buffer memory, gaining access to the system memory and reading the data stored in the buffer in system memory;
transmitting the data read from the buffer in system memory to the TX buffer memory;
transferring the data in the TX buffer memory to the device;
determining whether buffer in system memory should be closed prematurely;
if the buffer in system memory should be closed prematurely, modifying the transmit descriptor to include a corrected buffer length, wherein the corrected buffer length is less than the transmit buffer length value extracted from the transmit descriptor; and
providing the modified transmit descriptor to the processor for further processing.

27. The method of claim 26, wherein the determining whether the buffer in system memory should be closed prematurely includes determining if all data items in the buffer in system memory have been transferred.

28. The method of claim 26, wherein the modifying the transmit descriptor further includes clearing a full bit in the transmit descriptor.

29. The method of claim 26, wherein the transferring the data in the TX buffer memory to the device includes inserting a special character in the data transferred to the device.

30. A method of transferring characters from a first device through a buffer memory to a second device, the method comprising:
reading a descriptor generated by a processor;
extracting a buffer address and a buffer length value from the descriptor, wherein the buffer address and buffer length value define a buffer in the first device;
reading the data stored in the buffer in the first device;
transmitting the data read from the buffer in the first device to the buffer memory;
transferring the data in the buffer memory to the second device;
determining whether the buffer in the first device should be closed prematurely;
if the buffer in the first device should be closed prematurely, modifying the descriptor to include a corrected buffer length, wherein the corrected buffer length is less than the buffer length value extracted from the descriptor; and
providing the modified descriptor to the processor for further processing.

31. The method of claim 30, wherein the reading the data stored in the buffer includes:
determining if there is space for a predetermined number of data items in the buffer memory; and
if there is space for the predetermined number of data items in the buffer memory, gaining access to the buffer in the first device.

32. The method of claim 30, wherein the determining whether the buffer in the first device should be closed prematurely includes determining if all data items in the buffer have been transferred.

33. The method of claim 30, wherein the determining whether the buffer in the first device should be closed prematurely includes determining if an error or timeout has occurred.

34. The method of claim 30, wherein the first device is system memory.

35. The method of claim 34, further comprising taking control of a bus to the system memory through bus-mastering to gain access to the buffer.

36. The method of claim 30, wherein the modifying the descriptor further includes clearing a full bit in the descriptor.

37. The method of claim 30, wherein the transferring the data in the buffer memory to the second device includes inserting a special character in the data transferred to the second device.

38. The method of claim 30, wherein the first device is a Universal Asynchronous Receiver Transmitter (UART), a Universal Synchronous/Asynchronous Receiver Transmitter (USART), a Universal Serial Bus (USB) device or a PHY level device and wherein the second device is system memory, wherein the modifying the descriptor further includes clearing a full bit in the descriptor and storing the descriptor to the system memory.

* * * * *

UNITED STATES PATENT AND TRADEMARK OFFICE
CERTIFICATE OF CORRECTION

PATENT NO. : 7,610,415 B2
APPLICATION NO. : 11/191598
DATED : October 27, 2009
INVENTOR(S) : Mark H. Wickham et al.

It is certified that error appears in the above-identified patent and that said Letters Patent is hereby corrected as shown below:

In column 14, line 2, in Claim 26, delete "buffer" and insert -- the buffer --, therefor.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,610,415 B2
APPLICATION NO. : 11/191598
DATED : October 27, 2009
INVENTOR(S) : Wickham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Twelfth Day of October, 2010

David J. Kappos
*Director of the United States Patent and Trademark Office*